United States Patent
Egawa et al.

(10) Patent No.: US 6,678,603 B2
(45) Date of Patent: Jan. 13, 2004

(54) VEHICULAR ADAPTIVE CRUISE CONTROL APPARATUS AND METHOD WITH PRECEDING VEHICLE FOLLOWING CONTROL FUNCTION

(75) Inventors: Kenichi Egawa, Tokyo (JP); Kenta Kubota, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/046,765

(22) Filed: Jan. 17, 2002

(65) Prior Publication Data

US 2002/0095254 A1 Jul. 18, 2002

(30) Foreign Application Priority Data

Jan. 18, 2001 (JP) .......................... 2001-010651

(51) Int. Cl.$^7$ ................................ B60T 7/12
(52) U.S. Cl. ..................... 701/96; 701/93; 340/901
(58) Field of Search ................. 701/96, 97, 93, 701/95; 340/436, 901, 903, 904; 180/167

(56) References Cited

U.S. PATENT DOCUMENTS

| 4,463,822 A | * | 8/1984 | Tanigawa et al. ........... 180/177 |
| 6,178,372 B1 | * | 1/2001 | Tabata et al. ................ 701/97 |
| 6,233,516 B1 | * | 5/2001 | Egawa ......................... 701/96 |
| 6,389,351 B1 | * | 5/2002 | Egawa et al. ................. 701/93 |

FOREIGN PATENT DOCUMENTS

JP 2000-43611 2/2000

OTHER PUBLICATIONS

U.S. patent application Ser. No. 10/042,195, Akabori et al., filed Jan. 11, 2002.
U.S. patent application Ser. No. 10/058,109, Akabori et al., filed Jan. 29, 2002.

* cited by examiner

Primary Examiner—William A. Cuchlinski, Jr.
Assistant Examiner—Marthe Marc-Coleman
(74) Attorney, Agent, or Firm—Foley & Lardner

(57) ABSTRACT

In adaptive cruise control apparatus and method for an automotive vehicle, a velocity of the vehicle is detected, an inter-vehicle distance between the vehicle and a preceding vehicle which is a controlled system of a following run control is detected, a driving force of the vehicle is controlled to maintain the inter-vehicle distance at a target inter-vehicle distance when the inter-vehicle distance between the vehicle and the other vehicle is detected and to maintain the velocity of the vehicle at a set vehicle speed when no other vehicle is detected on the same traffic lane in the forward direction of the vehicle, and an acceleration value at an initial stage of an acceleration is set in such a manner as to be larger than that at a later stage of acceleration when the other vehicle detection state is transferred from the detection state to a non-detection state.

13 Claims, 8 Drawing Sheets

VEHICULAR ADAPTIVE CRUISE CONTROL APPARATUS AND METHOD WITH PRECEDING VEHICLE FOLLOWING CONTROL FUNCTION

BACKGROUND OF THE INVENTION

1. Field of the Invention

The present invention relates to vehicular adaptive cruise control apparatus and method for an automotive vehicle having a traveling control function of following a preceding vehicle which is a controlled system of a following control of the vehicle (hereinafter, also referred to as a host vehicle) and is traveling on the same traffic lane in a forward direction of the host vehicle.

2. Description of the Related Art

A Japanese Patent Application First Publication No. 2000-43611 published on Feb. 15, 2000 exemplifies a previously proposed adaptive cruise control apparatus. In the above-identified Japanese Patent Application First Publication, the previously proposed adaptive cruise control apparatus enlarges a magnitude of an acceleration from an actual host vehicular velocity to a target vehicular velocity so as to vary the actual host vehicular velocity quickly and smoothly to the target vehicular velocity when a vehicular run state is transferred from a cruise run state at a low velocity to the same cruise state at a high velocity. On the other hand, when the target vehicular velocity is varied under the cruise run state at the high vehicular velocity, the magnitude of the acceleration is made small so as to facilitate a fine setting of the host vehicular velocity.

SUMMARY OF THE INVENTION

The previously proposed adaptive cruise control apparatus, however, determines a target acceleration in accordance with the host vehicular velocity at a time point at which the acceleration is started. Hence, for example, suppose that, in a case where the host vehicle is following the preceding vehicle at a lower vehicular velocity than a driver's set vehicular velocity (so-called, a set vehicle speed), the preceding vehicle has changed its traveling traffic lane from the same traffic lane as the host vehicle to the adjacent traffic lane or the host vehicle has changed its traveling traffic lane to the adjacent traffic lane. At this time, the preceding vehicle becomes unrecognized and the host vehicle is accelerated to reach to the set vehicle speed. However, when the vehicular velocity of the host vehicle at the time of an acceleration start is low, a magnitude of the acceleration is set to be large.

Although a quick change in the actual vehicular velocity can occur, a large acceleration state is maintained even if the vehicular velocity approaches to a high vehicle velocity region. As a result of this, the large acceleration cannot accommodate the vehicular run control itself to a traveling feeling of the vehicular driver and such a vehicular run as described above gives an unpleasant feeling to the vehicle driver.

On the other hand, suppose that such an acceleration that the unpleasant feeling is not given to the vehicle driver is set and the vehicular acceleration is carried out at the set acceleration in spite of the vehicular velocity at the time of acceleration start. The vehicle driver does not feel unpleasant since the acceleration is constant. However, an arrival time duration for the host vehicle to arrive at the set vehicle speed is varied depending upon the vehicular velocity at the time of acceleration start. Hence, when the vehicular velocity at the time of acceleration start is low, the arrival time duration to the set vehicle speed becomes long. Consequently, the vehicle driver feels that a response characteristic of the adaptive cruise control becomes worsened.

It is, hence, an object of the present invention to provide vehicular adaptive cruise control apparatus and method for an automotive vehicle which can obtain an acceleration performance with a high responsive characteristic without giving an unpleasant feeling to the vehicle driver.

According to one aspect of the present invention, there is provided an adaptive cruise control apparatus for an automotive vehicle, comprising: a vehicular velocity detecting section that detects a velocity of the vehicle; an inter-vehicle distance detecting section that detects an inter-vehicle distance between the vehicle and another vehicle which is traveling on the same traffic lane as the vehicle in a forward direction thereof; a driving force controlling section that controls a driving force for the vehicle to maintain the inter-vehicle distance at a target inter-vehicle distance to achieve the following run control when the inter-vehicle distance detecting section detects the inter-vehicle distance between the vehicle and the other vehicle and to maintain the velocity of the vehicle at a set vehicle speed when the inter-vehicle distance detecting section detects no other vehicle on the same traffic lane in the forward direction thereof; and an acceleration controlling section that sets an acceleration value at an initial stage of an acceleration in such a manner as to be larger than that at a later stage of the acceleration when the inter-vehicle distance detecting section transfers its other vehicle detection state from the detection state of the other vehicle to a non-detection state thereof.

According to another aspect of the present invention, there is provided an adaptive cruise control method for an automotive vehicle, comprising: detecting a velocity of the vehicle; detecting an inter-vehicle distance between the vehicle and another vehicle which is traveling on the same traffic lane as the vehicle in a forward direction thereof; controlling a driving force for the vehicle to maintain the inter-vehicle distance at a target inter-vehicle distance to achieve the following run control when the inter-vehicle distance between the vehicle and the other vehicle is detected and to maintain the velocity of the vehicle at a set vehicle speed when no other vehicle is detected on the same traffic lane in the forward direction thereof; and setting an acceleration value at an initial stage of an acceleration in such a manner as to be larger than that at a later stage of the acceleration when the other vehicle detection state is transferred from the detection state of the other vehicle to a non-detection state thereof.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
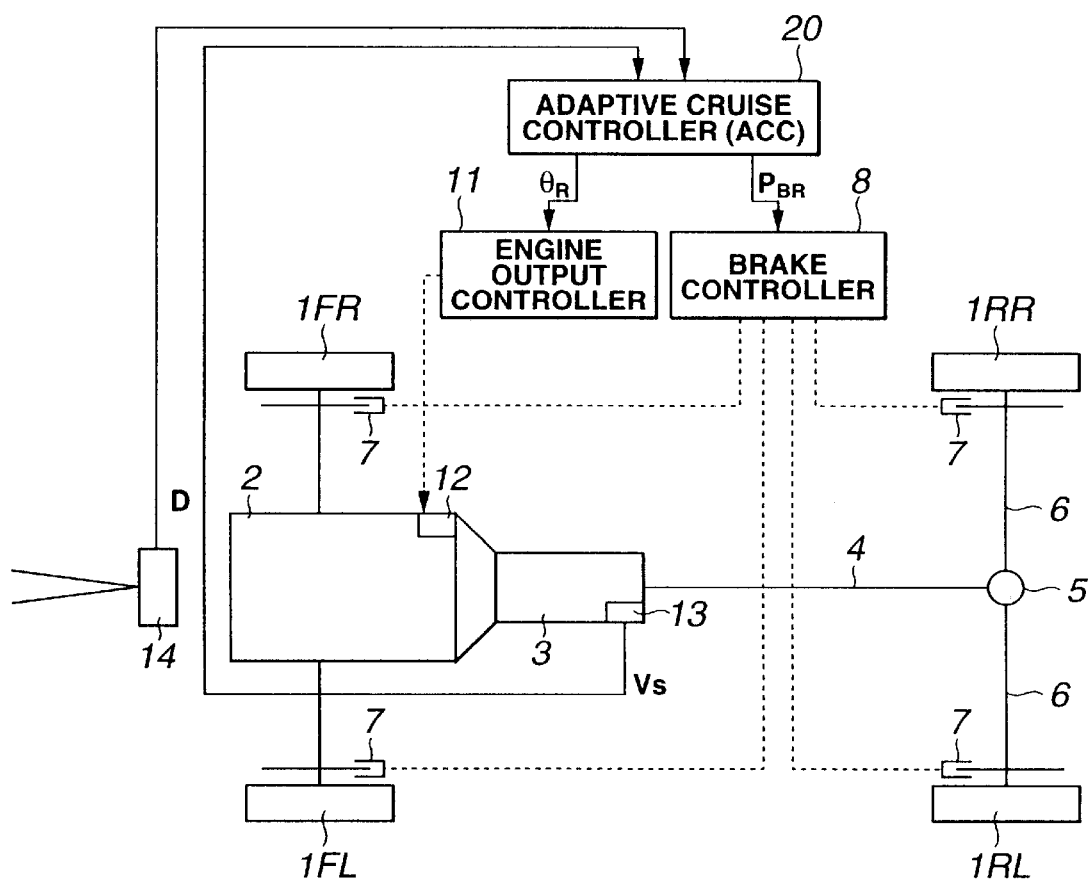
FIG. 1 is a schematic block diagram of a rough configuration of an adaptive cruise control apparatus in a first embodiment according to the present invention.

FIG. 1 shows a rough configuration of a rear wheel drive vehicle to which an adaptive cruise control apparatus in a first embodiment according to the present invention is applicable. In FIG. 1, front left and right road wheels 1FL and 1FR are non-driven wheels and rear left and right road wheels 1RL and 1RR are driven wheels. A driving force of an engine 2 is transmitted to rear left and right road wheels 1RL and 1RR via an automatic transmission A/T 3, a propeller shaft 4, a final speed-reduction gear unit 5, and a wheel axle 6.

Brake actuators 7 are constituted by, for example, disc brakes which develop braking forces on the front left and right and rear left and right road wheels 1FL, 1FR, 1RL, and 1RR. A brake controller 8 controls a braking oil pressure of each brake actuator 7. Brake controller 8 controls a brake system of the host vehicle to develop the braking oil pressure in accordance with a depression of a brake pedal (not shown) and to develop the same braking oil pressure in accordance with a braking pressure command value $P_{BR}$ from an adaptive cruise controller 20 as will be described later and outputs the braking oil pressure to the respective brake actuators 7.

In addition, an engine output controller 11 to control an output of engine 2 is installed in the vehicle shown in FIG. 1. A throttle actuator 12 is controlled so as to adjust an opening angle of a throttle valve of engine 2 in accordance with a throttle opening angle command value $\theta^*$ from adaptive cruise controller 20 as will be described later. A vehicular velocity sensor 13 is disposed to detect a vehicular velocity of the host vehicle Vs by detecting a rotation speed of an output axle disposed on an output side of automatic transmission 3.

An inter-vehicle distance sensor 14 is disposed on a front lower portion of a vehicle body of the host vehicle to detect an inter-vehicle distance D between the host vehicle and a preceding vehicle which is running ahead of the host vehicle. Inter-vehicle distance sensor 14 is constituted by a radar unit which radiates a laser beam and receives a reflected laser beam from the preceding vehicle. Adaptive cruise controller 20 receives vehicular velocity of the host vehicle Vs from vehicular velocity sensor 13 and inter-vehicle distance D from inter-vehicle distance sensor 14 and outputs braking pressure command value and target throttle opening angle command value $\theta^*$ to brake controller 8 and engine output controller 11 to control the inter-vehicle distance so as to become substantially equal to a target inter-vehicle distance when the preceding vehicle is trapped and to control vehicular velocity of the host vehicle Vs to become substantially equal to a set vehicle speed $V_{SET}$ which is set by a vehicular driver when no preceding vehicle is trapped.

Figure 2:
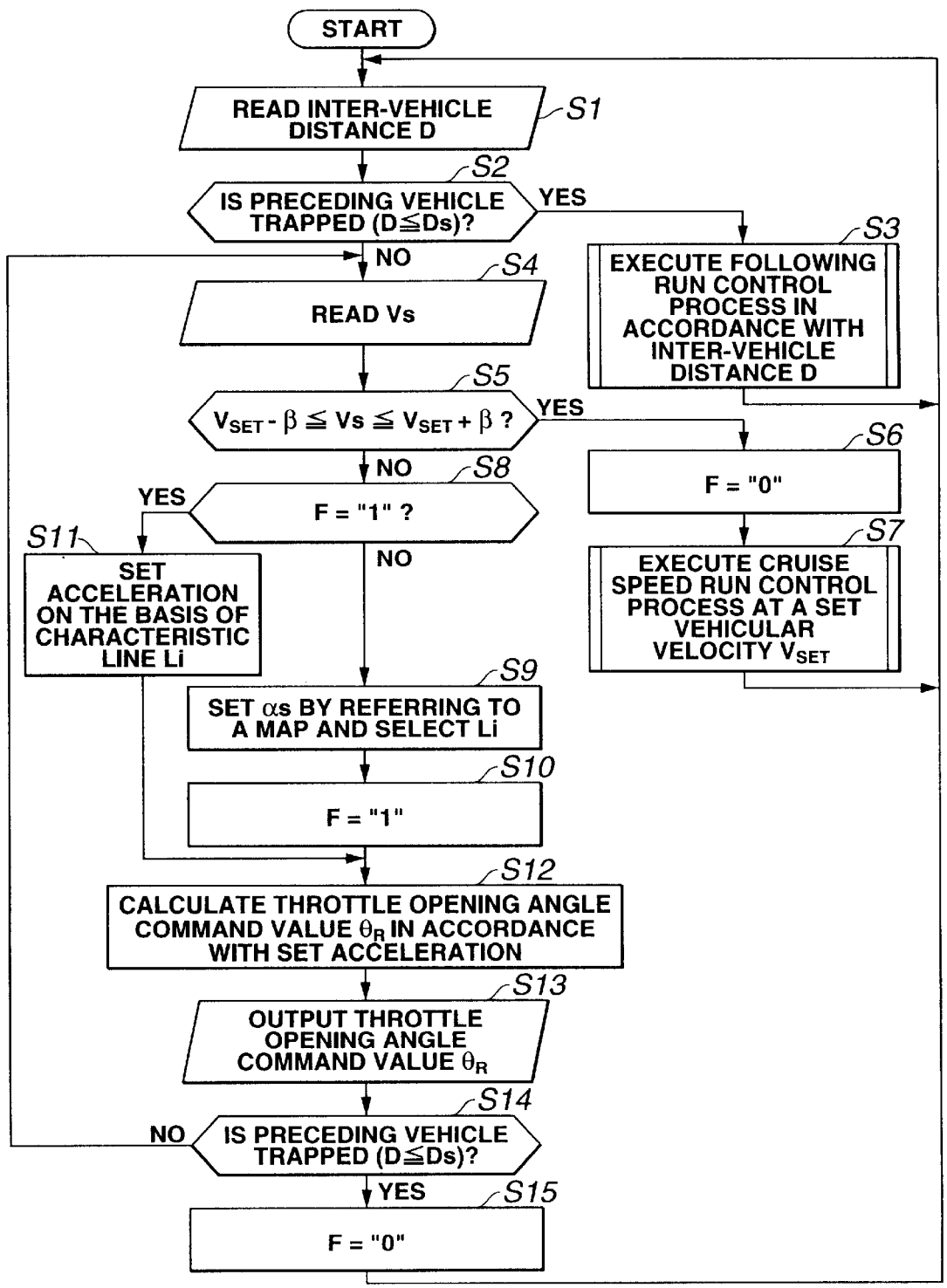
FIG. 2 is an operational flowchart representing an example of a following run control procedure executed by an adaptive cruise controller shown in FIG. 1.

FIG. 2 shows an operational flowchart of a following run control procedure executed by adaptive cruise controller 20 shown in FIG. 1. It is noted that each of adaptive cruise controller 20, engine output controller 11, and brake controller 8 is constituted by a microcomputer having a CPU (Central Processing Unit), a ROM (Read Only Memory), a RAM (Random Access Memory), an Input Port, an Output Port, a common bus, and its peripheral circuits.

In FIG. 2, at a step S1, adaptive cruise controller 20 reads inter-vehicle distance D detected by inter-vehicle distance sensor 14. At the next step S2, adaptive cruise controller 20 determines whether the detected inter-vehicle distance D is in excess of a threshold value Ds which is preset to determine whether the preceding vehicle is not trapped so as to determine whether the preceding vehicle is trapped or not. If $D \leq Ds$ (Yes) at step S2, adaptive cruise controller 20 determines that the preceding vehicle is being trapped and the routine goes to a step S3.

At step S3, adaptive cruise controller 20 calculates a target vehicular velocity V* on the basis of inter-vehicle distance D and target inter-vehicle distance D*, calculates braking pressure command value $P_{BR}$ and throttle opening angle command value $\theta_R$ so that the calculated target vehicular velocity V* and vehicular velocity Vs of the host vehicle are made coincident with each other. Calculated braking pressure command value $P_{BR}$ and opening angle command value $\theta_R$ of the throttle valve are outputted to brake controller 8 and engine output controller 11. Then, a following run control procedure which controls brake actuator 7 and throttle actuator 12 is executed at step S3 and the routine is returned to step S1.

On the other hand, if No at step S2, namely, if no preceding vehicle is trapped, the routine jumps to a step S4. At step S4, adaptive cruise controller 20 reads vehicular velocity of the host vehicle Vs and the routine goes to a step S5. At step S5, adaptive cruise controller 20 determines whether read host vehicular velocity Vs has reached to a proximity to the set vehicle speed $V_{SET}$ ($V_{SET} \pm \beta$). If Yes at step S5, the routine goes to a step S6. At step S6, adaptive cruise controller 20 resets an acceleration state flag F representing whether an acceleration control is being executed as will be described later to "0" and the routine goes to a step S7. At the step S7, adaptive cruise controller 20 calculates braking pressure command value $P_{BR}$ and throttle opening angle command value $\theta_R$ so as to maintain the host vehicular velocity Vs at set vehicle speed $V_{SET}$, outputs calculated braking pressure command value $P_{BR}$ and throttle opening angle command value $\theta_R$ to brake controller 8 and engine output controller 11, and executes a cruise speed run control procedure which controls brake actuator 7 and throttle actuator 12 and the routine returns to step S1.

If No, namely, vehicular velocity of the host vehicle Vs is lower than ($V_{SET}-\beta$) at step S5, the adaptive cruise controller determines that the present time is in the acceleration control state and determines whether the acceleration state flag F is set to "1" at a step S8.

If acceleration state flag F is reset to "0" at step S8 (No), adaptive cruise controller 20 determines that the present time is under an acceleration control start state and the routine goes to a step S9. At this time, adaptive cruise controller 20 calculates an acceleration at an initial stage of acceleration as by referring to an acceleration calculation map shown in FIG. 3 based on the present vehicular velocity of the host vehicle Vs and selects a characteristic line Li (i=1, 2, 3, 4, - - -, and n) from the map shown in FIG. 3 based on the same vehicular velocity of the host vehicle Vs. It is noted that the calculation map of FIG. 3 has a lateral axis representing vehicular velocity of the host vehicle Vs and a longitudinal axis representing acceleration α. A plurality of characteristic lines $L_1$ through $L_4$ are set in such a manner that as vehicular velocity of the host vehicle Vs becomes increased, a variation in the acceleration becomes smaller.

Then, initial accelerations $aS_1$ through $aS_4$ at the initial stage of accelerations which are maximum values of accelerations set by respective characteristic lines $L_1$ through $L_4$ are set to be gradually reduced as the characteristic line Li is selected in its ascending order from 1 ($L_1$) toward 4 ($L_4$) in each polygonal line manner. A value of accelerations of $\alpha s_1$ through $\alpha s_4$ at the initial stage of acceleration is set to an acceleration limit value in the following run control procedure. Furthermore, each characteristic line $L_1$ through $L_4$ is constituted by: a steep gradient straight line portion $L_A$ by which the acceleration is abruptly reduced up to a half of the corresponding one of initial accelerations $aS_1$ through $\alpha S_4$; another moderate gradient straight line $L_B$ whose gradient is moderate than straight line portion $L_A$; a still another moderate gradient straight line $L_c$ whose gradient is moderate than straight line portion $L_B$ whose acceleration is constant in a broken line form. It is noted that straight line portion $L_A$ of characteristic line $L_1$ is set to have a gradient larger than the same portions of characteristic lines $L_2$ through $L_4$.

Referring back to FIG. 2, the routine goes from step S10 at which acceleration state flag F is set to "1" and the routine goes to a step S12. On the other hand, if the acceleration state flag F is set to "1" (Yes) at step S8, the routine goes to a step S11. At step S11, adaptive cruise controller 20 calculates acceleration α in accordance with a characteristic line Li selected at step S9 and the routine goes to a step S12. At step S12, adaptive cruise controller 20 sets acceleration αs or α set at step S9 or step S11 as acceleration command value $\alpha_R$, calculates throttle opening command value $\theta_R$ in accordance with acceleration command value $\alpha_R$ and the routine goes to a step S13. At step S13, adaptive cruise controller 20 outputs calculated throttle opening angle value $\theta_R$ to engine output controller 11 to control throttle actuator 12 so as to execute the acceleration control and the routine goes to a step S14. At step S14, adaptive cruise controller 20 determines whether inter-vehicle distance sensor 14 traps the preceding vehicle in the same way as step S2. If no preceding vehicle is trapped (No) at step S14, the routine jumps to step S4. If Yes at step S14, the routine goes to a step S15 at which acceleration flag F is reset to "0" and the routine returns to step S1. The procedure shown in FIG. 2 corresponds to driving force controlling means and steps S4, S5, S8 through S15 correspond to acceleration controlling means.

Next, an operation of the above-described first preferred embodiment of the adaptive cruise control apparatus will be described below.

When the host vehicle is running to follow the preceding vehicle which is an controlled system of the following run control to control the driving force (including the braking force since the braking force is a minus driving force) with brake actuator 7 and throttle actuator 12, the following run control procedure is carried out since inter-vehicle distance D detected by inter-vehicle distance sensor 14 is smaller than threshold value Ds at step S3 of FIG. 2.

Under the above-described following run control state, if the preceding vehicle has changed the traffic lane to the adjacent traffic lane or has turned to right or left so that the preceding vehicle cannot be trapped, the routine shown in FIG. 2 is transferred from step S5 to step S6 at which acceleration control state flag F is reset to "0" and the routine goes to step S7 at which the cruise speed run control procedure is executed to maintain the vehicular velocity Vs at the set cruise speed $V_{SET}$.

Figure 3:
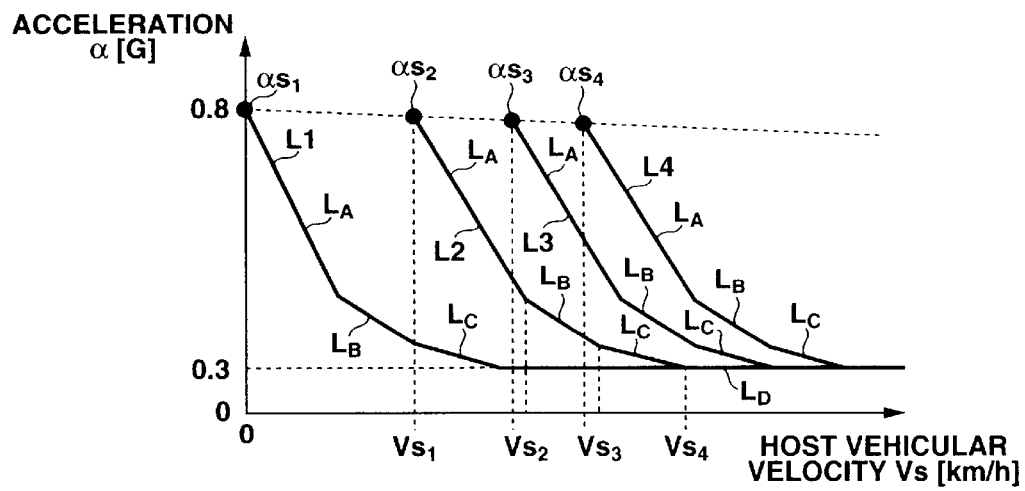
FIG. 3 is characteristic graph representing a map for a calculation of an acceleration with respect to a vehicular velocity of the host vehicle.
Figure 4:
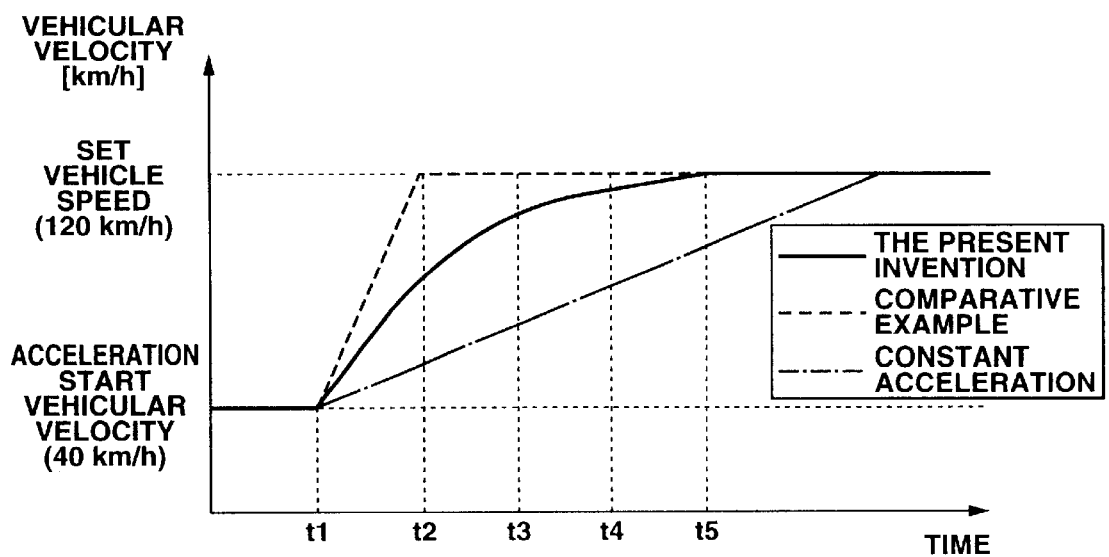
FIG. 4 is a timing chart for explaining an operation of the adaptive cruise control apparatus in the first embodiment shown in FIG. 1 when a vehicular velocity of the host vehicle at a time of acceleration start is low.

On the other hand, as shown in FIG. 4, suppose that a vehicular state is transferred from a state in which the host vehicle is following the preceding vehicle at a set vehicle speed $Vs_1$ which is approximately ⅓, for example, the set vehicle speed $V_{SET}$ to a state in which the preceding vehicle cannot be trapped due to the traffic lane change of the preceding vehicle to the adjacent traffic lane or the host vehicle traffic lane change to a turn-over traffic lane. At this time, since the vehicular velocity of the host vehicle Vs is the set vehicle speed $Vs_1$ which is considerably lower than $V_{SET}-\beta$ subtracted from the set vehicle speed $V_{SET}$ by predetermined value of β, adaptive cruise controller 20 determines that it is necessary to accelerate the host vehicle and the routine goes to step S8. At this time, since acceleration control state flag F is reset to "0", at step S9, adaptive cruise controller 20 calculates acceleration $\alpha S_2$, for example, by referring to acceleration calculation map shown in FIG. 3 on the basis of the host vehicular velocity Vs and selects characteristic line $L_2$ connected to the acceleration at the initial stage $\alpha s_2$.

Next, acceleration control flag F is set to "1" at step S10 and adaptive cruise controller 20 calculates at step S12 throttle opening angle command value $\theta_R$ in accordance with acceleration $\alpha s_j$ (j=1, 2, 3, 4, —i—) at the initial stage. At step S13, adaptive cruise controller 20 outputs calculated throttle opening angle command value $\theta_R$ to engine output controller 11. The acceleration control is initiated at the acceleration corresponding to acceleration at the initial stage $\alpha s_2$ at a time point t1 as denoted by a solid line of FIG. 4 by driving throttle actuator 12.

At this time, since acceleration at the initial stage $\alpha s_2$ is set to a value equal to or larger than an acceleration limit value in the following run control as described above, a large acceleration can be achieved when the host vehicle has changed its traffic lane to the turn-over traffic lane so that the response characteristic can be increased and a turn over of another vehicle can be facilitated. Next, the routine returns to step S4, step S5, and goes to step S8. Since acceleration state flag F is set to "1", the routine goes to step S11. In this state, the acceleration is started with a large acceleration $\alpha S_2$ at the initial stage and vehicular velocity of the host vehicle Vs is increased at a relatively large increase rate. Accordingly, acceleration α is reduced gradually at a constant variation rate along with the increase in the host vehicular velocity Vs along straight line portion $L_A$ of characteristic line of $L_2$.

Then, at a time point t2 in FIG. 4, the host vehicular velocity Vs is in excess of set vehicle speed $Vs_2$ and along the straight line portion $L_A$ of characteristic line $L_B$. In this state, a reduction rate of acceleration a with respect to the increase in the host vehicle velocity Vs is reduced and the rate in increase of host vehicular velocity Vs becomes smooth. At a time point t3 of FIG. 4, host vehicular velocity Vs is in excess of set vehicle speed $Vs_3$ and along characteristic line Lc of characteristic line $L_2$, reduction rate of acceleration α is furthermore is decreased so that the increase rate of host vehicular velocity Vs becomes more moderate.

Thereafter, at a time point of t4, host vehicular velocity Vs has reached to set vehicle speed Vs4. At this time, acceleration α is fixed to a minimum value and increase rate of host vehicular velocity Vs becomes minimum. When host vehicular velocity Vs has reached to the proximity to set vehicle speed $V_{SET}$, the routine goes from step S5 to step S6. Acceleration state flag F is reset to "0" and the routine goes to step S7 at which the cruise speed run control process is executed to maintain host vehicular velocity Vs at the set vehicle speed $V_{SET}$.

On the other hand, suppose a case where the host vehicle is running at vehicle speed $Vs_H$ which is, for example, ⅔ set vehicle speed $V_{SET}$ to follow the preceding vehicle and, thereafter, the preceding vehicle is not trapped due to the host vehicle or preceding vehicle has changed its traffic lane to the adjacent lane. In this case, as shown in a solid line of FIG. 5, acceleration is initiated at acceleration $αs_4$ at the initial stage which is approximated in a case where the acceleration is started at the vehicle speed of $Vs_1$ and, thereafter, acceleration α is decreased in accordance with the increase in host vehicle velocity Vs so that the increase in host vehicular velocity Vs is gradually moderated and reaches to set vehicle speed $V_{SET}$.

Figure 5:
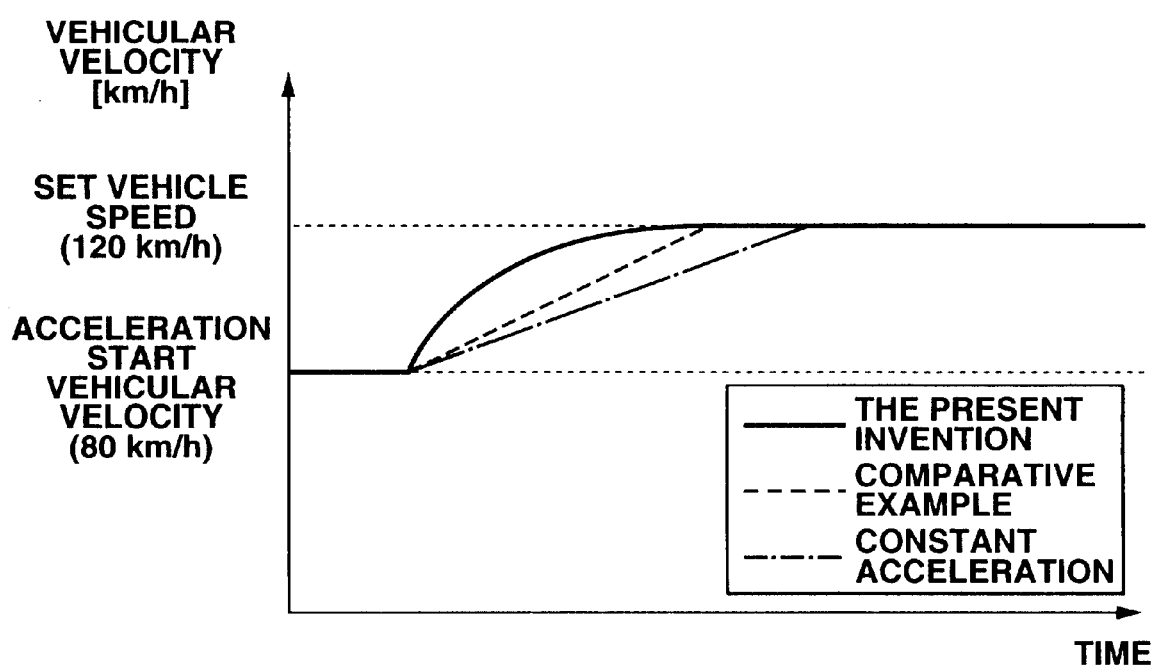
FIG. 5 is a timing chart for explaining another operation of the adaptive cruise control apparatus in the first preferred embodiment when the vehicular velocity of the host vehicle is high.

As described in the first embodiment, acceleration magnitudes at the initial stage of acceleration $αs_1$ through $αs_4$ are set to be larger than acceleration magnitudes of the later stage thereof and reduction rate of acceleration α in accordance with the increase in the host vehicular velocity Vs is modified in the decrease direction sequentially in accordance with the increase in the host vehicular velocity Vs. Hence, as shown in FIGS. 4 and 5, the vehicle is accelerated at a high acceleration when the acceleration is initiated. As the host vehicular velocity Vs approaches to set vehicle speed $V_{SET}$, acceleration α is reduced so that host vehicular velocity Vs moderately reaches to target vehicular velocity (in this case, set vehicle speed) $V_{SET}$ so that an acceleration performance is in conformity to a drive feeling of the vehicle that the vehicular driver gives. In a comparative example in which the acceleration is set in accordance with host vehicular velocity at the time of acceleration start, a large acceleration is set when acceleration start vehicular velocity is small as denoted by broken lines of FIGS. 4 and 5. Especially, as shown in FIG. 4, when the vehicular velocity at the time of acceleration start is small, the large deceleration is set and, on the contrary, when the vehicular velocity at the time of acceleration start is large, the small acceleration is set. Especially, when the vehicular velocity of acceleration start is small, as shown in FIG. 4, the vehicular velocity of the vehicle reaches to set vehicle speed $V_{SET}$ maintaining high acceleration. This running situation is deviated from the drive feeling of the vehicular driver and an unpleasant feeling is given to the driver. In addition, in a case where the acceleration is set to be constant irrespective of the vehicular velocity at the time of acceleration start, as denoted by dot-and-dash lines of FIGS. 4 and 5, the vehicle is always accelerated at the constant acceleration so that the driver gives an insufficiently satisfying feeling to a vehicular response characteristic.

Figure 6:
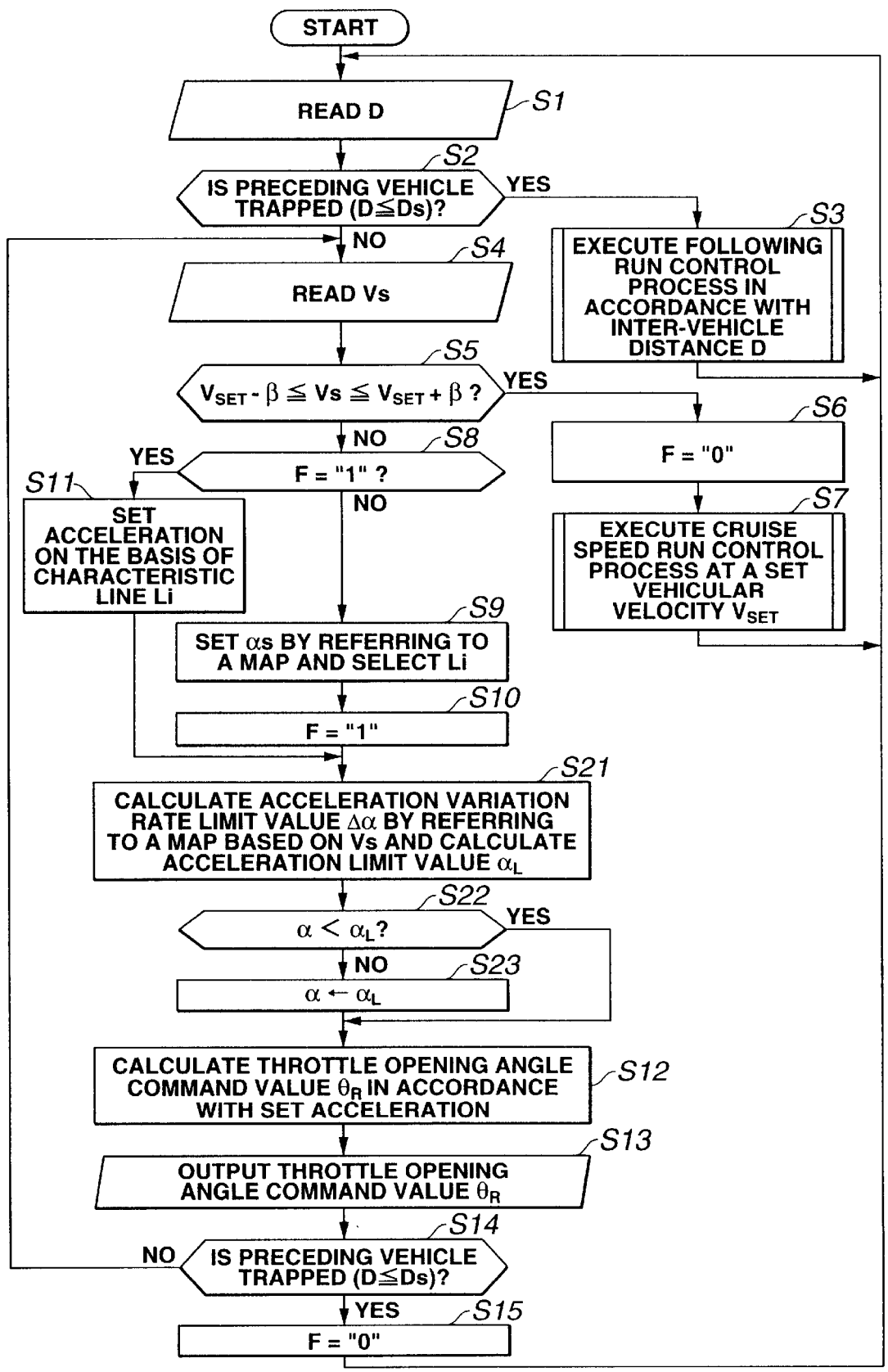
FIG. 6 is an operational flowchart representing an example of the following run control procedure executed by the adaptive cruise controller of the adaptive cruise control apparatus in a second embodiment according to the present invention.
Figure 7:
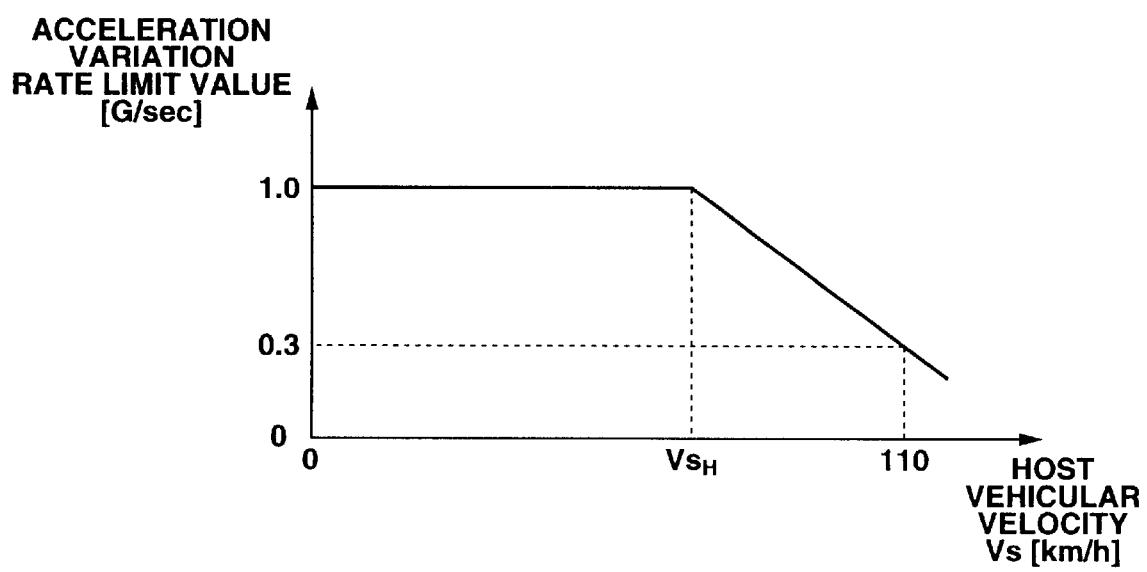
FIG. 7 is a characteristic graph representing an acceleration limit value calculation map of a relationship between the vehicular velocity of the host vehicle and the acceleration limit value.

Next, a second embodiment of the adaptive cruise control apparatus according to the present invention will be described with reference to FIGS. 6 and 7.

In the second embodiment, when host vehicular velocity Vs is equal to or larger than a predetermined value, acceleration limit value is reduced in accordance with the increase in host vehicular velocity Vs. In details, in the second embodiment, the following run control procedure executed by adaptive cruise controller 20 is shown in FIG. 6. As shown in FIG. 6, a step S21, a step S22, and a step S23 are inserted between a junction of steps S10 and S11 and step S12 shown in FIG. 2 described in the first embodiment. At step S21, adaptive cruise controller 20 calculates an acceleration variation rate limit value Δα by referring to an acceleration variation rate limit value calculation map shown in FIG. 7 on the basis of host vehicular velocity Vs and calculates an acceleration limit value $α_L$ ($=α_R(i-1)+Δα$) to add calculated acceleration variation rate limit value $α_L$ to a previous acceleration command value $α_R$ (i−1). At step S22, adaptive cruise controller 20 determines whether acceleration value α set at step S9 or S11 is smaller than acceleration limit value $α_L$. If $α<α_L$ (Yes) at step S21, the routine goes to step S12. If $α≧α_L$ (No) at step S22, the routine goes to step S23 at which set acceleration α is limited to acceleration limit value $α_L$. The same processing as FIG. 2 except steps S21 through S23 is carried out in the second embodiment as shown in FIG. 6. The corresponding processes to FIG. 2 are assigned to the same reference numerals and their detailed description will herein be omitted. The acceleration variation rate limit value calculation map shown in FIG. 7 is a characteristic diagram of host vehicular velocity Vs on a lateral axis and acceleration variation rate limit value of Δα on a longitudinal axis. Acceleration variation rate limit value Δα is set to a constant value which is slightly larger than initial acceleration $αs_1$ through $αs_4$ set in acceleration calculation map while host vehicular velocity Vs fall in a range from "0 (zero)" to relatively high vehicular velocity $V_{SH}$. If host vehicular velocity Vs is increased to a value higher than high vehicular velocity $V_{SH}$, acceleration variation rate limit value Δα is set to be linearly decreased in accordance with the increase in host vehicular velocity Vs. It is noted that the procedure shown in FIG. 6 corresponds to driving force controlling means and steps S4, S5, S8 through S15, and S21 through S23 correspond to acceleration controlling means, and steps S21 through S23 correspond to acceleration variation rate limiting means.

In the second embodiment, if host vehicular velocity Vs is equal to or lower than high vehicular velocity $V_{SH}$, acceleration limit value $α_L$ indicates a value which is an addition of acceleration variation limit value Δα which is set to be larger than accelerations $αS_1$ through $αS_4$ calculated by acceleration calculation map shown in FIG. 3 to previous acceleration command value $α_R(i-1)$. If host vehicular velocity Vs is in excess of high vehicular velocity $V_{SH}$, acceleration variation rate limit value Δα is gradually decreased along with the increase in host vehicular velocity Vs. As host vehicular velocity Vs becomes higher, acceleration limit value $α_L$ becomes nearer to previous acceleration command value $α_R$ (i−1). Accordingly, acceleration α set at steps S9 or S11 is limited. Therefore, since acceleration variation rate is suppressed to become small as host vehicular velocity Vs becomes high, abrupt acceleration variation is always suppressed without failure so that such an acceleration control that matches further to the driver's drive feeling can be achieved. It is noted that although, in the second embodiment, acceleration variation rate limit value $\Delta\alpha$ is decreased in the linear manner in accordance with the increase in the host vehicular velocity when host vehicular velocity Vs is in excess of high vehicular velocity $VS_H$. However, the present invention is not limited to this. That is to say, acceleration variation rate limit value $\Delta\alpha$ may be decreased in a stepwise manner or in an arc-shape manner.

Next, a third embodiment of the adaptive cruise control apparatus according to the present invention will be described with reference to FIGS. 8 and 9. In the third embodiment, the acceleration is set in accordance with a vehicular velocity deviation between host vehicular velocity Vs at the time of the acceleration start and set vehicle speed $V_{SET}$. That is to say, in the third embodiment, a step S31 to calculate a vehicular velocity deviation $\Delta V$ ($\Delta V = V_{SET} - Vs$) which is a subtraction of a vehicular velocity Vs from set vehicle speed $V_{SET}$ set by the vehicular driver and a step S32 to calculate an acceleration gain $K_G$ by referring to an acceleration gain calculation map shown in FIG. 9 on the basis of the calculated vehicular velocity deviation $\Delta V$ are interposed between steps S9 and S10 of FIG. 2 described in the first embodiment. A step S33 to calculate an acceleration command value $\alpha R$ (=$K_G \cdot \alpha$) by multiplying set acceleration $\alpha$ by acceleration gain $K_G$ is interposed between steps S10 or S11 and S12. Except that steps S31, S32, and S33, the same processing as that shown in FIG. 2 is executed. The same reference numeral steps shown in FIG. 6 as those shown in FIG. 2 correspond to the like processes. Hence, the detailed description thereof will be omitted herein.

Figure 8:
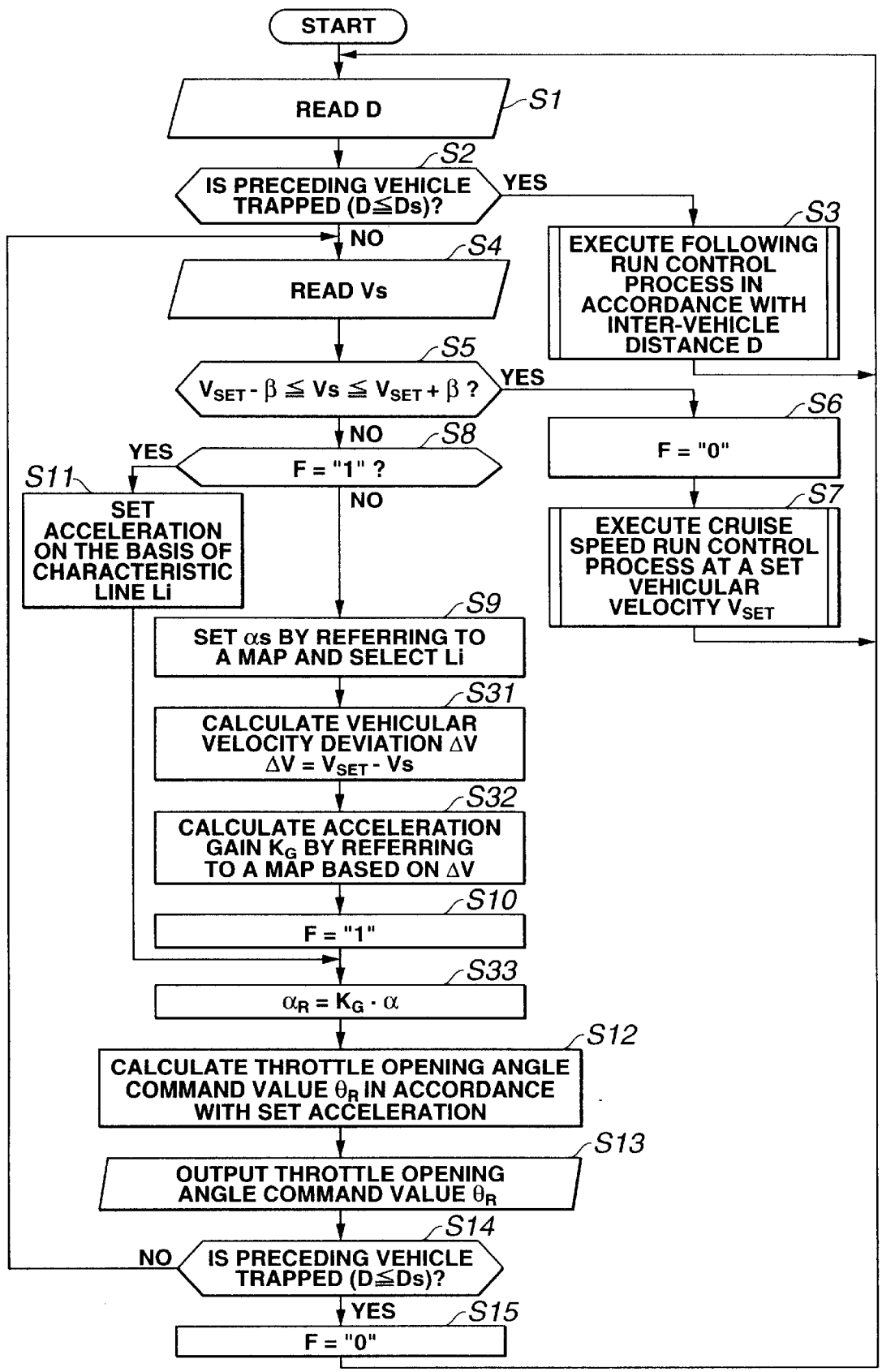
FIG. 8 is an operational flowchart representing an example of a following run control procedure executed in the adaptive cruise controller of the adaptive cruise control apparatus in a third embodiment according to the present invention.
Figure 9:
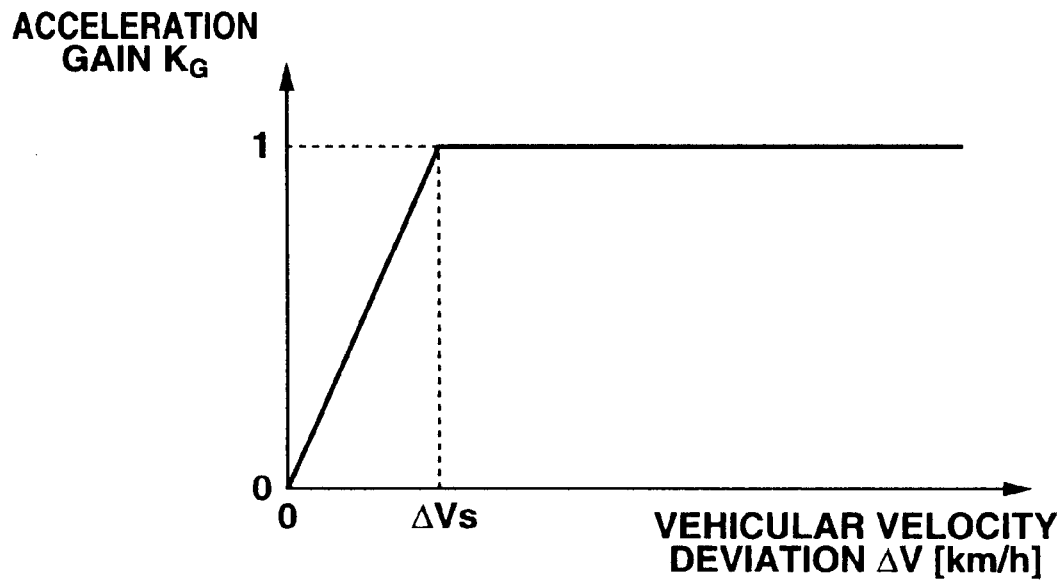
FIG. 9 is a characteristic graph representing an acceleration gain calculation map of an example of a relationship between a vehicular velocity deviation and the acceleration gain.

FIG. 9 shows an acceleration gain calculation map having its lateral axis of a vehicular deviation $\Delta V$ and its longitudinal axis of an acceleration gain $K_G$. If vehicular velocity deviation $\Delta V$ is zero, acceleration gain $K_G$ is set to "0 (zero)". Along with the increase in vehicular velocity deviation $\Delta V$, acceleration gain $K_G$ is increased. If vehicular velocity deviation $\Delta V$ has reached to set value $\Delta Vs$, acceleration gain $K_G$ is set to "1 (one)". Irrespective of the increase in vehicular velocity deviation $\Delta V$, acceleration gain $K_G$ is maintained at "1". The process shown in FIG. 8 corresponds to driving force controlling means and the steps S4, S5, S8 through S15, and steps S31 through S33 correspond to acceleration controlling means. In the third embodiment, when the preceding vehicle is not trapped by inter-vehicle distance sensor 14 due to the traffic lane change of the host vehicle or the preceding vehicle to the adjacent lane from a state in which the host vehicle is following the preceding vehicle, the routine of FIG. 8 goes to step S9 via steps S1, S2, S4, S5, and S8. In the same manner as each of the first and second embodiments, acceleration at the initial stage $\alpha s_i$ is set and characteristic line Li is selected. Next, at step S31, adaptive cruise controller 20 calculates vehicular velocity deviation $\Delta V$ by subtracting host vehicular velocity Vs at the initial stage from vehicular velocity $V_{SET}$ set by the driver and calculates acceleration gain $K_G$ by referring to acceleration gain calculation map on the basis of calculated vehicular velocity deviation $\Delta V$ at step S32. Then, at a step S33, acceleration command value $\alpha_R$ is calculated by multiplying calculated acceleration gain $K_G$ with acceleration $\alpha$ and throttle opening angle command value $\theta_R$ corresponding to calculated acceleration command value $\alpha_R$ is calculated to control throttle actuator 12. Therefore, if vehicular velocity deviation $\Delta V$ which is the subtraction of host vehicular velocity Vs from set vehicle speed $V_{SET}$ at the time of acceleration start is equal to or larger than a set value $\Delta Vs$, acceleration-gain $K_G$ is set to "1". Hence, large acceleration at the initial stage of acceleration $\alpha s_i$ is set on the basis of instantaneous host vehicular velocity Vs in the same manner as described in each of the first and second embodiments. Then, acceleration at the initial stage $\alpha s_i$ is multiplied by acceleration gain $K_G$ of 1 so that the acceleration command value $\alpha_R$ is set. Hence, throttle opening angle command value $\theta_R$ in accordance with acceleration command value $\alpha_R$ is calculated. Thus, throttle actuator 12 is controlled.

Therefore, the acceleration control at a large acceleration at the initial stage of acceleration $\alpha s_i$ is started and acceleration $\alpha$ is decreased along characteristic line Li and the increase rate of host vehicular velocity Vs is gradually reduced as described with reference to FIG. 4.

On the other hand, if vehicular velocity deviation $\Delta V$ at the time of acceleration start is smaller than set value $\Delta Vs$, the routine of FIG. 8 goes to step S32 at which acceleration gain $K_G$ calculated with reference to acceleration gain calculation map of FIG. 9 is a value smaller than "1". Then, since acceleration command value $\alpha_R$ is calculated by multiplying acceleration $\alpha$ calculated by referring to acceleration calculation map (in FIG. 3) with acceleration gain $K_G$, both acceleration $\alpha s_i$ at the initial stage and acceleration $\alpha$ to be calculated thereafter are suppressed.

Hence, even if characteristic lines $L_2$ through $L_4$ of acceleration calculation map as described in the first embodiment are set to have mutually the same forms, vehicular velocity deviation $\Delta V$ is smaller than set value $\Delta Vs$. In this case, as vehicular velocity deviation $\Delta V$ becomes smaller, acceleration gain $K_G$ becomes smaller so that acceleration command value $\alpha_R$ is suppressed to be a small value. At this time, acceleration control in accordance with vehicular velocity deviation $\Delta V$ at the time of the start of acceleration is carried out. Consequently, such an acceleration control as to be accurately matched to the drive feeling of the driver can be achieved.

Figure 10:
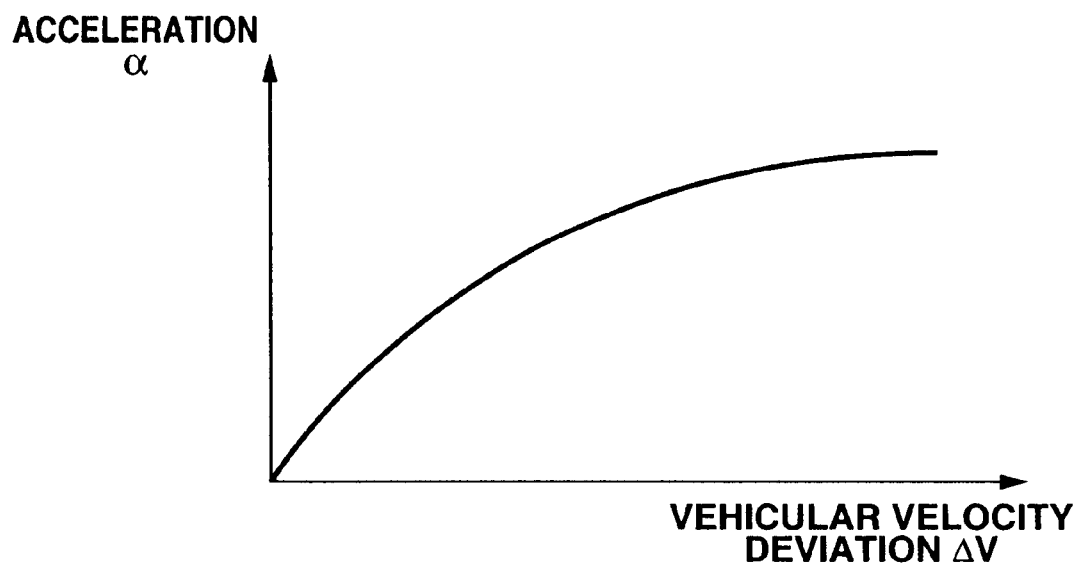
FIG. 10 is a characteristic graph representing an acceleration calculation map of another example of the relationship between the vehicular velocity deviation and the acceleration.

It is noted that, in the third embodiment, acceleration gain $K_G$ is linearly increased by acceleration gain from its calculation map in accordance with an increase in vehicular velocity deviation $\Delta V$. However, the present invention is not limited to this. The characteristic lines may be set in curve forms so as to be accommodated to the drive feeling of the driver. In addition, in each of the first, second, and third preferred embodiments, acceleration $\alpha$ is calculated by referring to an acceleration calculation map of FIG. 3. However, the present invention is not limited to this. Vehicular deviation $\Delta V$ between set vehicle speed $V_{SET}$ and host vehicular velocity Vs may be calculated and acceleration $\alpha$ may be calculated using an acceleration calculation map shown in FIG. 10 representing a relationship between vehicular deviation $\Delta V$ and acceleration $\alpha$ on the basis of vehicular deviation $\Delta V$. Furthermore, in each of the first, second, and third embodiments, target vehicular velocity $V^*$ in accordance with a deviation between inter-vehicle distance D and target inter-vehicle distance $D^*$ in the following run control procedure has been described. The present invention is not limited to this. Target acceleration/deceleration $G_L^*$ on the basis of a deviation between target inter-vehicle distance $D^*$ and actual inter-vehicle distance D may be calculated and the driving force may be controlled on the basis of target acceleration/deceleration $G_L^*$.

Furthermore, in each of the first, second, and third embodiments, the laser radar is used for inter-vehicle distance sensor 14. The present invention is not limited to this. Another range finder such as a millimeter wave radar may be applied.

Still furthermore, in each of the first, second, and third embodiments, a series of calculation processes by means of a software in adaptive cruise controller 20 has been described. The present invention is not limited to this. A hardware including an electronic circuitry constituted by function generators, comparators, arithmetic operation and logic circuits may be applied to the present invention.

In addition, in each of the first, second, and third embodiments, disc brakes 7 have been applied. The present invention is not limited to this. Other actuators such as drum brakes may be applied or electrically controlled brake actuators other than braking pressures maybe applied. In this case, in place of braking pressure command value $P_{BR}$, a command value such as a target current may be calculated and may be outputted to brake controller 8 which controls the brake actuator on the basis of the command value. Such modifications and variations as described above can be made without departing from the sprit of the present invention.

The entire contents of a Japanese Patent Application No. 2001-010651(filed in Japan on Jan. 18, 2001) are herein incorporated by reference. The scope of the invention is defined with reference to the following claims.

What is claimed is:

1. A cruise control apparatus for a vehicle, comprising:
   an acceleration controller configured to control acceleration of a first vehicle when a second vehicle that is within a target inter-vehicle distance and was traveling in a same traffic lane as the first vehicle is no longer in the same traffic lane as the first vehicle,
   wherein the acceleration controller accelerates the first vehicle at a first acceleration value during an initial stage of acceleration and at a second acceleration value during a subsequent stage of acceleration, the first acceleration value being larger than the second acceleration value,
   wherein the acceleration controller selects the first acceleration value and the second acceleration value from an acceleration calculation map, and
   wherein the acceleration calculation map includes a plurality of characteristic lines, each characteristic line including an initial stage acceleration value and at least one subsequent stage acceleration value, the first acceleration value and the second acceleration value being selected along the same characteristic line of the plurality of characteristic lines.

2. The cruise control apparatus as claimed in claim 1, wherein the initial stage acceleration value of each characteristic line is set based on a present velocity of the vehicle in such a manner that as the present velocity becomes higher, the initial stage acceleration value becomes smaller.

3. The cruise control apparatus as claimed in claim 1, wherein the plurality of characteristic lines each have a gradient such that as a present velocity of the vehicle increases, a difference between the present velocity of the vehicle and a target velocity of the vehicle decreases.

4. The cruise control apparatus as claimed in claim 3, wherein the acceleration controller limits an acceleration variation rate based on the gradient of a given characteristic line in such a manner that as the present velocity of the vehicle increases, the acceleration variation rate becomes smaller.

5. The cruise control apparatus as claimed in claim 4, wherein the acceleration variation rate follows a polygonal line reduction as the present velocity of the vehicle increases.

6. The cruise control apparatus as claimed in claim 4, wherein the acceleration controller is configured to limit the acceleration variation rate by:
   calculating an acceleration variation rate limit value $\Delta\alpha$ on the basis of a target velocity $V_{SET}$;
   calculating an acceleration limit value $\alpha_L$ on the basis of a present acceleration command value $\alpha_R$ and a previous acceleration command value $\alpha_R(i-1)$; and
   determining whether a present set acceleration $\alpha$ is equal to or larger than $\alpha_L$,
   wherein the acceleration controller limits the acceleration variation rate to $\alpha_L$ when $\alpha$ is equal to or larger than $\alpha_L$.

7. The cruise control apparatus as claimed in claim 6, wherein the present acceleration command value $\alpha_R = K_G \times \alpha$, $K_G$ denoting an acceleration gain derived on the basis of a vehicular velocity deviation $\Delta V$ between the target velocity $V_{SET}$ and the present velocity at the initial stage of acceleration.

8. The cruise control apparatus as claimed in claim 7,
   wherein the acceleration gain $K_G$ is set to "0" when the vehicular velocity deviation $\Delta V$ is "0", and
   wherein the acceleration gain $K_G$ is set to "1" when the vehicular velocity deviation $\Delta V$ is equal to or larger than a preset value $\Delta V_s$.

9. A cruise control apparatus for a vehicle, comprising:
   an acceleration controller configured to control acceleration of a first vehicle when a second vehicle that is within a target inter-vehicle distance and was traveling in a same traffic lane as the first vehicle is no longer in the same traffic lane as the first vehicle,
   wherein the acceleration controller accelerates the first vehicle at a first acceleration value during an initial stage of acceleration and at a second acceleration value during a subsequent stage of acceleration, the first acceleration value being larger than the second acceleration value, and
   wherein the first acceleration value is set based on a present velocity of the vehicle, the first acceleration value decreasing in magnitude as the present velocity of the vehicle decreases.

10. A cruise control apparatus for a vehicle, comprising:
    an acceleration controller configured to control acceleration of a first vehicle when a second vehicle that is within a target inter-vehicle distance and was traveling in a same traffic lane as the first vehicle is no longer in the same traffic lane as the first vehicle; and
    a driving force controller configured to maintain a target velocity of the first vehicle when the second vehicle is within the target inter-vehicle distance and traveling in the same traffic lane as the first vehicle,
    wherein the acceleration controller accelerates the first vehicle at a first acceleration value during an initial stage of acceleration and at a second acceleration value during a subsequent stage of acceleration, the first acceleration value being larger than the second acceleration value.

11. The cruise control apparatus as claimed in claim 10, wherein the first acceleration value is set to a maximum acceleration value when the driving force controller is maintaining the target velocity of the first vehicle.

12. The cruise control apparatus as claimed in claim 10, wherein the first acceleration value is set based on a difference between a present velocity of the vehicle and the target velocity of the vehicle in such a manner that as the difference becomes smaller, the first acceleration value becomes smaller.

13. A cruise control apparatus for a vehicle, comprising:

an acceleration controller configured to control acceleration of a first vehicle when a second vehicle that is within a target inter-vehicle distance and was traveling in a same traffic lane as the first vehicle is no longer in the same traffic lane as the first vehicle, wherein the acceleration controller accelerates the first vehicle at a first acceleration value during an initial stage of acceleration and at a second acceleration value during a subsequent stage of acceleration, the first acceleration value being larger than the second acceleration value, and wherein the acceleration controller limits an acceleration variation rate based on a present velocity of the vehicle in such a manner that as the present velocity of the vehicle becomes higher, the acceleration variation rate becomes smaller.

* * * * *